(12) United States Patent
Yao

(10) Patent No.: US 11,938,675 B2
(45) Date of Patent: Mar. 26, 2024

(54) 3D PRINTING DEVICE AND 3D PRINTING METHOD

(71) Applicant: LUXCREO (BEIJING) INC., Beijing (CN)

(72) Inventor: Zhifeng Yao, Beijing (CN)

(73) Assignee: LUXCREO (BEIJING) INC., Beijing (CN)

( * ) Notice: Subject to any disclaimer, the term of this patent is extended or adjusted under 35 U.S.C. 154(b) by 0 days.

(21) Appl. No.: 16/619,869

(22) PCT Filed: Apr. 9, 2018

(86) PCT No.: PCT/CN2018/082280
§ 371 (c)(1),
(2) Date: Dec. 5, 2019

(87) PCT Pub. No.: WO2018/223761
PCT Pub. Date: Dec. 13, 2018

(65) Prior Publication Data
US 2020/0101658 A1    Apr. 2, 2020

(30) Foreign Application Priority Data
Jun. 6, 2017 (CN) .......................... 201710418091.4

(51) Int. Cl.
*B29C 64/129* (2017.01)
*B29C 64/255* (2017.01)
(Continued)

(52) U.S. Cl.
CPC .......... *B29C 64/129* (2017.08); *B29C 64/255* (2017.08); *B29C 64/268* (2017.08);
(Continued)

(58) Field of Classification Search
CPC ... B29C 64/129; B29C 64/255; B29C 64/268; B29C 64/277; B29C 64/124;
(Continued)

(56) References Cited

U.S. PATENT DOCUMENTS

2007/0063389 A1    3/2007  John
2009/0309267 A1*  12/2009  Boot .................... B29C 64/135
                                                                      264/496

(Continued)

FOREIGN PATENT DOCUMENTS

CN          204076846 U       1/2015
CN          105365216 A       3/2016
(Continued)

OTHER PUBLICATIONS

CN105799168A Espacenet translation, retrieved Jun. 10, 2021 (Year: 2016).*

(Continued)

*Primary Examiner* — Jacob T Minskey
*Assistant Examiner* — Caroline Beha
(74) *Attorney, Agent, or Firm* — METIS IP LLC

(57) ABSTRACT

The present invention discloses a three-dimensional printing device, comprising: a chassis, a light source and a controller, wherein a liquid storage tank is arranged in the middle of the chassis, an anti-sticking element is arranged on the inner wall of the liquid storage tank, and the liquid storage tank is used for holding polymerizable liquid; and further comprising: a base which is adapted to the liquid storage tank in a para-position way, wherein the base is connected with a driving device, and the light source is matched with the bottom of the base. By using the anti-sticking element as a covering part for the liquid storage tank, the forming part formed by curing the polymerizable liquid can lose contact with the anti-sticking element quickly and efficiently, so as (Continued)

to carry out further formation and processing operations. In this way, the whole three-dimensional printing process is more rapid and efficient. Meanwhile, the damage to the structure of the product or component caused by excessive adhesion during the separation of the formed product from the device component is effectively avoided, and therefore the processing effect of the product and the stable operation of the device component are ensured. The present invention further discloses a three-dimensional printing method using the above three-dimensional printing device.

8 Claims, 3 Drawing Sheets

(51) Int. Cl.
  *B29C 64/268* (2017.01)
  *B29C 64/277* (2017.01)
  *B33Y 10/00* (2015.01)
  *B33Y 30/00* (2015.01)
(52) U.S. Cl.
  CPC ............ *B29C 64/277* (2017.08); *B33Y 10/00* (2014.12); *B33Y 30/00* (2014.12)
(58) Field of Classification Search
  CPC ..... B29C 67/0077; B33Y 10/00; B33Y 30/00; B28B 1/001; B22F 3/008; B22F 3/1055; F05D 2230/20; F05D 2230/22; F05D 2230/30; F05D 2230/31; F05D 2230/312; F05D 2230/313; F05D 2230/314
  See application file for complete search history.

(56) References Cited

U.S. PATENT DOCUMENTS

| | | | | |
|---|---|---|---|---|
| 2014/0069889 A1* | 3/2014 | Ohtsu | .................... | B82Y 40/00 |
| | | | | 216/37 |
| 2016/0288413 A1* | 10/2016 | Yakubov | ................ | B33Y 10/00 |
| 2016/0368206 A1 | 12/2016 | Lee | | |
| 2017/0247580 A1* | 8/2017 | Chandak | .................... | C09J 7/38 |
| 2018/0126646 A1* | 5/2018 | Zitelli | .................. | B29C 64/223 |
| 2018/0341184 A1* | 11/2018 | Hundley | ................ | B33Y 30/00 |

FOREIGN PATENT DOCUMENTS

| | | |
|---|---|---|
| CN | 105799168 A | 7/2016 |
| CN | 106079495 A | 11/2016 |
| CN | 107031036 A | 8/2017 |
| CN | 206765363 U | 12/2017 |
| WO | WO 2015/170890 A1 | 11/2015 |

OTHER PUBLICATIONS

Kim et al., Tribology issues in nanoimprint lithography, Journal of Mechanical Science and Technology 24 (2010) 5~12 (Year: 2010).*
PCT International Search Report and Written Opinion, PCT/CN2018/082280, dated Jun. 5, 2018, 14 pages.
The Extended European Search Report in European Application No. 18814243.4 dated Mar. 4, 2020, 7 pages.
The Fourth Office Action in Chinese Application No. 201710418091.4 dated Feb. 24, 2021, 23 pages.

* cited by examiner

3D PRINTING DEVICE AND 3D PRINTING METHOD

TECHNICAL FIELD

The present invention relates to the technical field of three-dimensional fabrication and associated devices, and in particular to a three-dimensional printing device. The present invention further relates to a three-dimensional printing method using the three-dimensional printing device.

BACKGROUND

The three-dimensional printing technique, also called the 3D printing technique, generally includes laser photocuring, fused deposition modeling and three-dimensional printing and other mainstream techniques. Among them, the laser photocuring has become the current mainstream development trend due to its high speed, high precision and miniaturization, etc. However, the laser photocuring technique still has obvious drawbacks.

Specifically, the pulled-up type photosensitive resin laser photocuring technique has the following main problems. The substrate of the photosensitive resin pallet is a transparent organic film, and due to the great surface tension of the photosensitive resin formed on the surface of the substrate, both the liquid resin and the formed cured resin are less adhered to the substrate. However, despite of low adhesion, when the cured layer of the formed resin is vertically pulled out of the film substrate, such a low adhesion is enough to cause damage to the film and the resin in the cured layer. This leads to the loss of both the thickness of the film and the mechanical strength of the cured model. A solution known in the art is to design a complicated mechanical structure in which, whenever a layer is formed, the pallet is tangentially rotated left and right, which is equivalent to making the film obliquely lifted up from the cured layer. In this way, the adhesion becomes much lower and the damage to both the film and the model is minimized. However, this solution fails to fundamentally solve the problem of peeling-off of the cured layer, and instead increases the machine cost and the printing time.

Therefore, how to make the three-dimensional printing process easier and more efficient and avoid the damage to both the device and the product is an important technical problem required to be solved by those skilled in the art at present.

SUMMARY

An objective of the present invention is to provide a three-dimensional printing device, which can make the three-dimensional printing process easier and more efficient and avoid the damage to both the device and the product. Another objective of the present invention is to provide a three-dimensional printing method using the above three-dimensional printing device.

To solve the technical problem described above, the present invention provides a three-dimensional printing device, comprising: a chassis, a light source and a controller, wherein a liquid storage tank is arranged in the middle of the chassis, an anti-sticking element is arranged on the inner wall of the liquid storage tank, and the liquid storage tank is used for holding polymerizable liquid; and further comprising: a base which is adapted to the liquid storage tank in a para-position way, wherein the base is connected with a driving device, and the light source is matched with the bottom of the base.

Preferably, there are a plurality of microscopic three-dimensional modules on the outer surface of the anti-sticking element, the ratio between the length from an fitting end of the microscopic three-dimensional module to its free end and the maximum lateral side length of its longitudinal cross-section is 1-1000, and the ratio between the length from the fitting end of the microscopic three-dimensional module to its free end and the lateral spacing between the fitting ends of two adjacent microscopic three-dimensional modules is 1-1000.

Preferably, the adhesion force between a forming part made of the same material and the anti-sticking element is less than 50% of the adhesion force between a forming part made of the same material and a polytetrafluoroethylene workpiece having a flat surface.

Preferably, each of the microscopic three-dimensional modules is any one of a cylindrical module, a conical module, a tower-shaped module, a boss module, a fiber module and a hole module.

Preferably, the maximum lateral side length of the longitudinal cross-section of the microscopic three-dimensional module is 0.01-10 μm.

Preferably, the anti-sticking element is a polymer thin film.

Preferably, the anti-sticking element is a fluorine-containing polymer thin film.

Preferably, the anti-sticking element is any one of a polytrifluorochloroethylene film, a polytetrafluoroethylene film, a polyvinylidene fluoride film, a poly(vinylfluoride) film, a polytrichloroethylene film, a vinylidene fluoride-trifluorochloroethylene copolymer film, a tetrafluoroethylene-perfluoroalkyl ether copolymer film, a tetrafluoroethylene-hexafluoropropylene copolymer film, a vinylidene fluoride-hexafluoropropylene copolymer film, an ethylene-tetrafluoroethylene copolymer film, an ethylene-trifluorochloroethylene copolymer film, a fluorine-containing acrylate copolymer film and a fluorinated ethylene propylene film.

Preferably, the anti-sticking element is integrally formed with the liquid storage tank.

Preferably, the light source is any one of a full spectrum halogen lamp, an ultraviolet light-emitting diode (LED) and a laser diode.

The present invention further provides a three-dimensional printing method using the three-dimensional printing device of any one of the preceding claims, comprising the following steps:

initial formation: irradiating, by the light source, a portion of the bottom of the base which is in contact with the polymerizable liquid in the liquid storage tank, so that the polymerizable liquid in the range of irradiation is cured after a certain period of time, to form a forming part that is adhered to the bottom of the base;

moving for separation: stopping the irradiation after the forming part is formed, and then the controller controlling, by the driving device, the base to move a certain distance in a direction away from the light source, wherein due to the function of the anti-sticking element, the adhesion between the forming part and the base is greater than the adhesion between the forming part and the anti-sticking element, making the forming part directly lose contact with the anti-sticking element and move together with the base;

continuous formation: driving the formed forming part, by the base, to continuously rise to a certain height so that a gap is formed between the forming part and the anti-sticking element, then irradiating, by the light source again, the polymerizable liquid at a corresponding position, so that the polymerizable liquid is cured to form a unibody structure together with the previously formed forming part, and separated from the anti-sticking element again after formation; and circular processing: repeating the above step of continuous formation until the form of the forming part meets the requirements on the final processed product, and taking down the finally formed forming part from the three-dimensional printing device.

Preferably, the formation rate of the forming part in the movement direction of the base is 2-200 cm/h.

Compared with the techniques mentioned in the Background, the three-dimensional printing device provided the present invention has the following advantages: during the operation of the three-dimensional printing device, by using the anti-sticking element as a covering part for the liquid storage tank, the forming part formed by curing the polymerizable liquid can lose contact with the anti-sticking element quickly and efficiently, so as to carry out further formation and processing operations. In this way, the whole three-dimensional printing process is more rapid and efficient. Meanwhile, the damage to the structure of the product or component caused by excessive adhesion during the separation of the formed product from the device component is effectively avoided, and therefore the processing effect of the product and the stable operation of the device component are ensured.

BRIEF DESCRIPTION OF THE DRAWINGS

To describe the technical solutions in the embodiments of the present invention or in the prior art more clearly, the accompanying drawings to be used in the description of the embodiments or the prior art will be briefly described below. Apparently, the drawings described hereinafter show only some of embodiments of the present invention, and a person of ordinary skill in the art can obtain other drawings according to these drawings without paying any creative effort.

DETAILED DESCRIPTION OF THE PRESENT INVENTION

The core of the present invention is to provide a three-dimensional printing device that can make the three-dimensional printing process easier and more efficient and avoid the damage to both the device and the product. Meanwhile, the present invention further provides a three-dimensional printing method using the above three-dimensional printing device.

To make those skilled in the art to better understand the solutions of the present invention, the present invention will be further described in detail with reference to the accompanying draws and embodiments.

Figure 1:
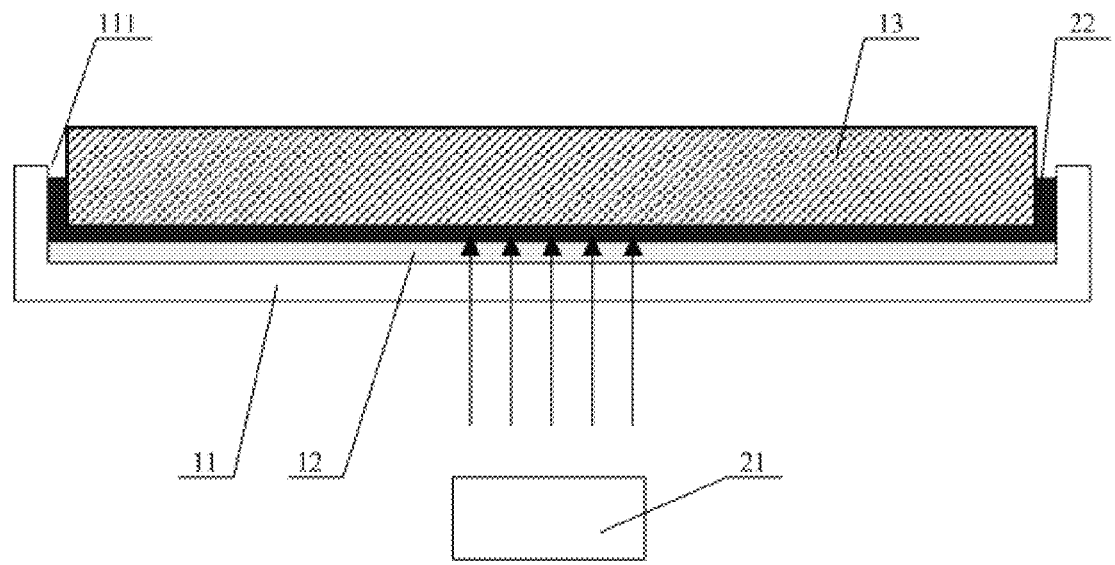
FIG. 1 is a structural diagram of a three-dimensional printing device according to an embodiment of the present invention in the initial operating state.
Figure 2:
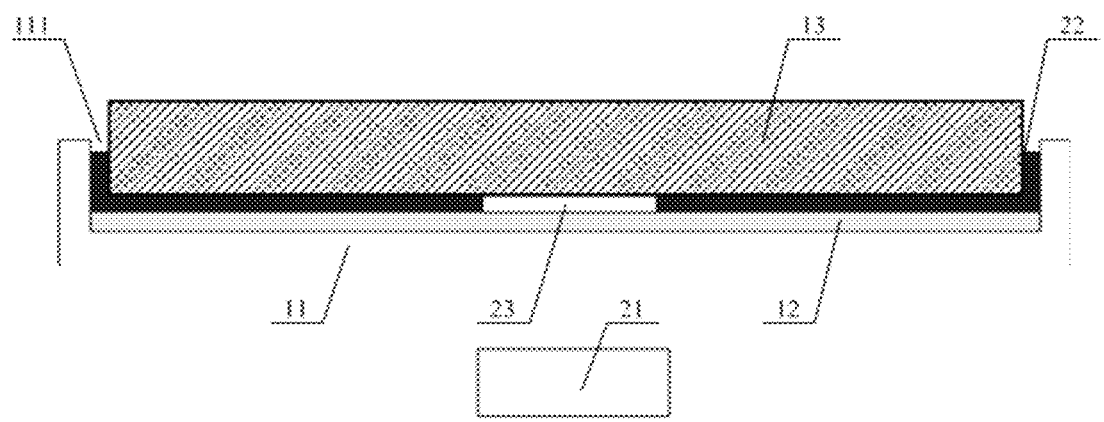
FIG. 2 is a structural diagram of the three-dimensional printing device of FIG. 1 during the initial formation of the forming part.
Figure 3:
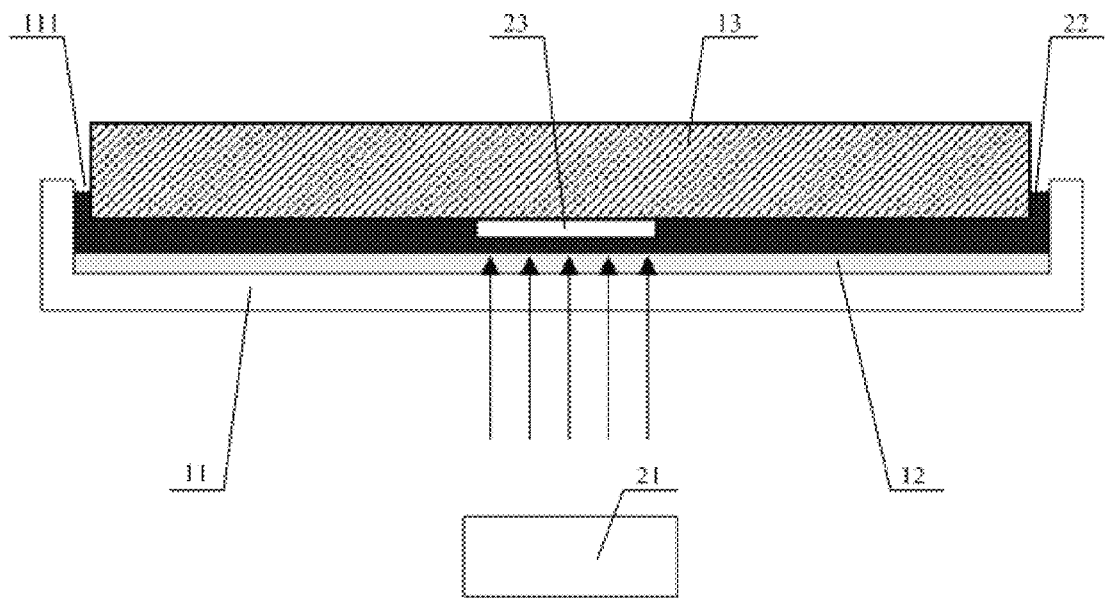
FIG. 3 is a structural diagram of the three-dimensional printing device of FIG. 1 when the base rises a certain distance after the forming part is initially formed.
Figure 4:
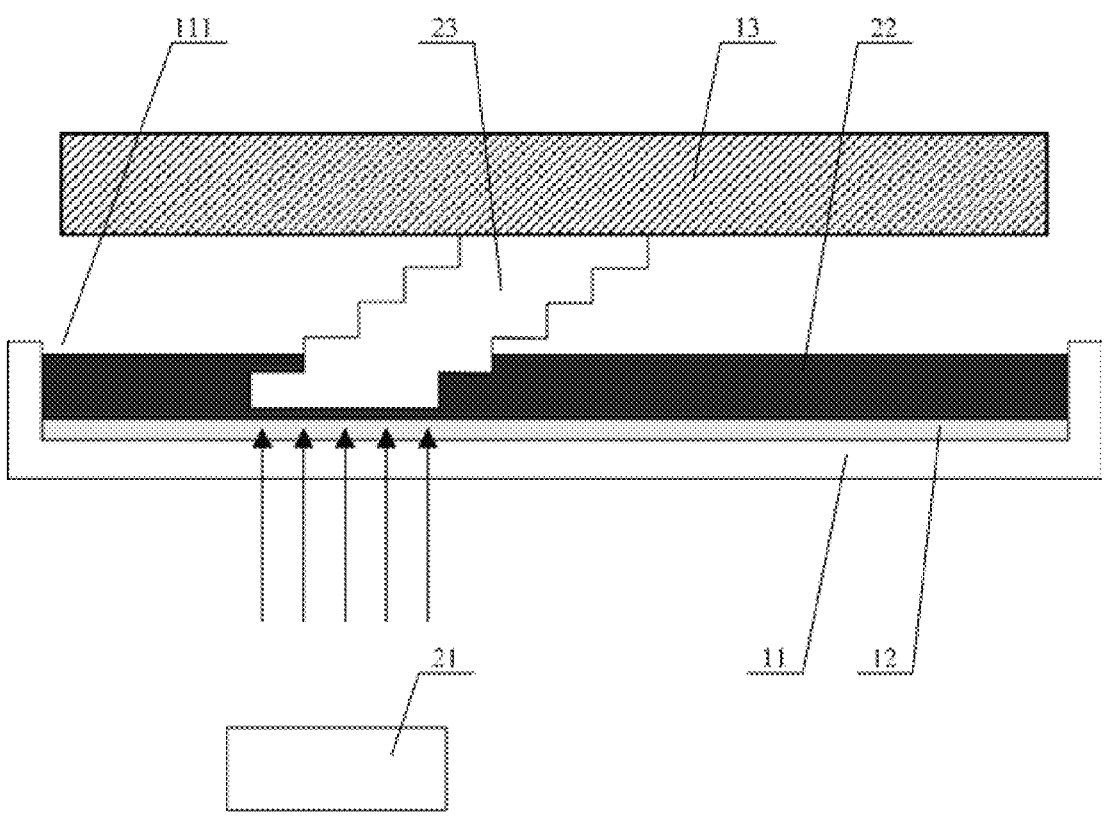
FIG. 4 is a structural diagram of the three-dimensional printing device of FIG. 1 during the continuous formation of the forming part by curing.

Referring to FIGS. 1-4, FIG. 1 is a structural diagram of a three-dimensional printing device according to an embodiment of the present invention in the initial operating state; FIG. 2 is a structural diagram of the three-dimensional printing device of FIG. 1 during the initial formation of the forming part; FIG. 3 is a structural diagram of the three-dimensional printing device of FIG. 1 when the base rises a certain distance after the forming part is initially formed; and FIG. 4 is a structural diagram of the three-dimensional printing device of FIG. 1 during the continuous formation of the forming part by curing.

In an embodiment, the three-dimensional printing device provided in the present invention comprises: a chassis 11, a light source 21 and a controller (not shown in the figures), wherein a liquid storage tank 111 is arranged in the middle of the chassis 11, an anti-sticking element 12 is arranged on the inner wall of the liquid storage tank 111, and the liquid storage tank 111 is used for holding polymerizable liquid 22. The three-dimensional printing device of the present invention further comprises a base 13 which is adapted to the liquid storage tank 111 in a para-position way, wherein the base 13 is connected with a driving device (not shown in the figures), and the light source 21 is matched with the bottom of the base 13.

During the operation, by using the anti-sticking element 12 as a covering part for the liquid storage tank 111, the forming part 23 formed by curing the polymerizable liquid 22 can lose contact with the anti-sticking element 12 quickly and efficiently, so as to carry out further formation and processing operations. In this way, the whole three-dimensional printing process is more rapid and efficient. Meanwhile, the damage to the structure of the product or component caused by excessive adhesion during the separation of the formed product from the device component is effectively avoided, and therefore the processing effect of the product and the stable operation of the device component are ensured.

It should be noted that, specifically during the practical application, the base 13 is not limited to be located above the liquid storage tank 111 as shown in the figure, and instead, it may be located in the liquid storage tank 111 or at other positions where it can work together with the polymerizable liquid in the liquid storage tank 111. In principle, the base 13 may be located at any position as long as the actual use requirement of the three-dimensional printing device can be met.

Further, there are a plurality of microscopic three-dimensional modules on the outer surface of the anti-sticking element 12, the ratio between the length from an fitting end of the microscopic three-dimensional module to its free end and the maximum lateral side length of its longitudinal cross-section is 1-1000, and the ratio between the length from the fitting end of the microscopic three-dimensional module to its free end and the lateral spacing between the fitting ends of two adjacent microscopic three-dimensional modules is 1-1000. Each of the microscopic three-dimensional modules has a protrusion structure, by which the effective contact area between the forming part 23 and the anti-sticking element 12 can be significantly reduced. Thus, the adhesion between the anti-sticking element 12 and the forming part 23 is further decreased, such that the separation efficiency and the formation effect of the forming part 23 are further improved.

Specifically, the ratio of the adhesion force between a forming part 23 made of the same material and the anti-sticking element 12 to the adhesion force between the forming part 23 made of the same material and a polytetrafluoroethylene workpiece having a flat surface is less than 50%. That is, assuming that the adhesion between the forming part 23 made of the same material and the anti-sticking element 12 is F and the adhesion between the forming part 23 made of the same material and the polytetrafluoroethylene workpiece having a flat surface is f, there is F/f<0.5.

More specifically, each of the microscopic three-dimensional modules is any one of a cylindrical module, a conical module, a tower-shaped module, a boss module, and a hole module. During the practical application, the shape of the microscopic three-dimensional modules may be flexibly adjusted according to the operating condition. In principle, the microscopic three-dimensional module may be in any shape as long as the actual use requirement of the three-dimensional printing device can be met.

In addition, the microscopic three-dimensional module has a side length of 0.01-10 µm. This size is merely a preferred solution. During the practical application, the size parameter of each microscopic three-dimensional module is not limited thereto. The microscopic three-dimensional module may be in any size as long as the actual use requirement of the three-dimensional printing device can be met.

In another aspect, the anti-sticking element 12 is a polymer film, and further preferably, a fluorine-containing polymer film. Such a polymer film, particularly a fluorine-containing polymer film, has lower surface adhesion so that the separation of the forming part 23 from the anti-sticking element 12 can be realized with no loss and high efficiency.

In addition, the anti-sticking element 12 is any one of a polytrifluorochloroethylene film, a polytetrafluoroethylene film, a polyvinylidene fluoride film, a poly(vinylfluoride) film, a polytrichloroethylene film, a vinylidene fluoride-trifluorochloroethylene copolymer film, a tetrafluoroethylene-perfluoroalkyl ether copolymer film, a tetrafluoroethylene-hexafluoropropylene copolymer film, a vinylidene fluoride-hexafluoropropylene copolymer film an ethylene-tetrafluoroethylene copolymer film, an ethylene-trifluorochloroethylene copolymer film, a fluorine-containing acrylate copolymer film and a fluorinated ethylene propylene film. The various films mentioned above are merely preferred solutions. During the practical application, the material of the anti-sticking element 12 may be flexibly selected by those skilled in the art according to the operating condition. In principle, the anti-sticking element 12 may be made of any material as long as the actual use requirement of the three-dimensional printing device can be met.

Further, the anti-sticking element 12 is integrally formed with the liquid storage tank 111. Such a unibody structure is helpful for enhancing the structural strength of the assembly of the liquid storage tank 111 and the assembling reliability of mating members associated with the anti-sticking element 12, thus ensuring that the related components can work stably and reliably during the operation of the device.

In addition, the light source 21 is any one of a full-spectrum halogen lamp, an ultraviolet-band LED and a laser diode. In principle, the above three types of light sources may be replaced with each other indistinguishably. However, during the practical application, considering the operating condition and the actual cost, those skilled in the art may flexibly select the type of the light source, so as to meet the use requirement of the three-dimensional printing device under different conditions.

It should be noted that, during the practical application, the base 13 is preferably a member made of rigid material such as stainless steel or Al alloy. Thus, the overall structure of the base 13 becomes lighter while ensuring the structural strength.

Figure 5:
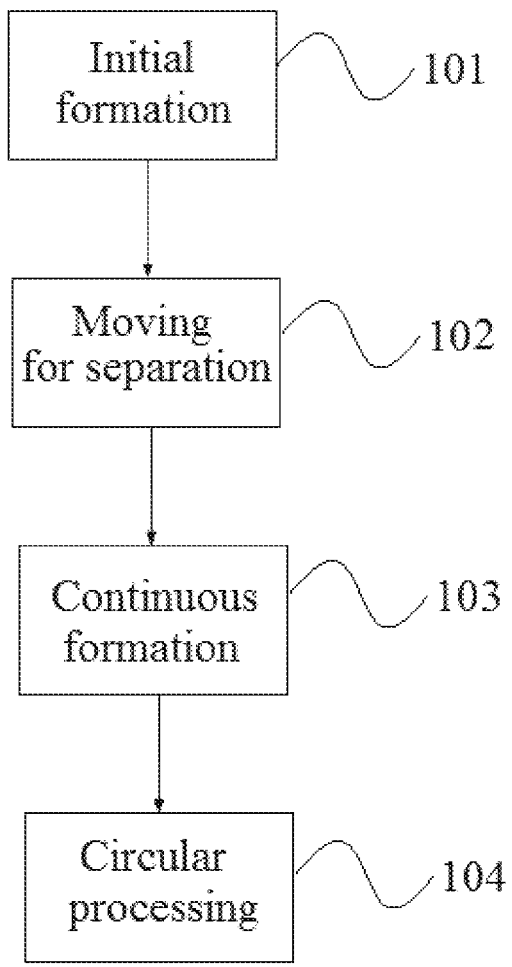
FIG. 5 is a flowchart of a three-dimensional printing method according to an embodiment of the present invention.

Referring to FIG. 5, it is a flowchart of a three-dimensional printing method according to an embodiment of the present invention.

In an embodiment, the three-dimensional printing method of the present invention which is used for the three-dimensional printing device described above, comprises the following steps:

step 101, initial formation:

a portion of the bottom of the base 13 in contact with the polymerizable liquid 22 in the liquid storage tank 111 is irradiated by the light source 21, so that the polymerizable liquid in the range of irradiation is cured after a certain period of time, to form a forming part 23 that is adhered to the bottom of the base. The state of the device corresponding to the step 101 may refer to FIGS. 1 and 2.

Step 102, moving for separation:

the irradiation is stopped after the forming part 23 is formed, and then the controller controls, by the driving device, the base 13 to move a certain distance in a direction away from the light source, wherein due to the function of the anti-sticking element 12, the adhesion between the forming part 23 and the base 13 is greater than the adhesion between the forming part 23 and the anti-sticking element 12, making the forming part 23 directly lose contact with the anti-sticking element 12 and move together with the base 13. The state of the device corresponding to the step 102 may refer to FIG. 3.

It should be noted that, specifically in this solution, the relative position relationship shown in the figure indicates that the base 13 is located above the liquid storage tank 111, so in the step 102, the controller controls, by the driving device, the base 13 to rise a certain distance. However, during the practical application, the relative position between the base 13 and the liquid storage tank 111 is not limited thereto. Those skilled in the art may flexibly adjust the relative position and coordination relationship between the base 13 and the liquid storage tank 111 according to the operating condition. In principle, any relative position and coordination relationship between the base 13 and the liquid storage tank 111 is possible as long as the actual operation requirement of the three-dimensional printing method can be met.

In addition, it is to be noted that, in the above step 102, the forming part 23 directly loses contact with the anti-sticking element 12 and moves together with the base 13. In contrast, in the prior art, instead of directly separating the forming part 23 from the mating member (its position may refer to the position of the anti-sticking element 12 in this solution) at the liquid storage tank 111, the mating member is driven by a corresponding actuating component to turn or displace in one direction so that the mating member is partially separated from the forming part 23, and then, the base 13 is moved and the forming part 23 is completely separated from the mating member based on the movement of the forming part 23 together with the base 13. That is, in the prior art, the complete separation of the forming part 23 from the corresponding mating member at the liquid storage tank 111 is realized by two steps, while in this solution, since the anti-sticking element 12 is used as a member mated with the forming part 23, the complete separation of the forming part 23 from the anti-sticking element 12 can be realized directly by a single action of the base 13 alone.

Step 103, continuous formation:

the formed forming part 23 is driven, by the base 13, to continuously rise to a certain height so that a gap is formed between the forming part 23 and the anti-sticking element 12, then the polymerizable liquid 22 at a corresponding position is irradiated again by the light source 21 so that the polymerizable liquid is cured to form a unibody structure together with the previously formed forming part 23, and separated from the anti-sticking element 12 again after formation. The state of the device corresponding to the step 103 may refer to FIG. 4.

It should be noted that, specifically during the practical operation, in the above step 103 of continuous formation, the way in which the formed forming part 23 is driven by the base 13 to move is not limited to the displacement in the vertical direction, for example, the formed forming part 23 is driven to rise a certain height as described above. Instead, the formed forming part 23 may be driven to displace a certain distance in the horizontal direction according to the actual requirements on the processing of products. The formation effect in the case of displacement in both the vertical direction and the horizontal direction is shown in FIG. 4. However, the actual formation effect of the forming part 23 is not limited to what is shown in the figure, and the form of the forming part 23 should be determined by the requirements on the processing of products during the practical operation and the final formation effect of the products.

Step 104, circular processing:

the above step 103 of continuous formation is repeated until the form of the forming part 23 meets the requirements on the final processed product, and the finally formed forming part 23 is taken down from the three-dimensional printing device. The state of the device corresponding to the step 104 may still refer to FIG. 4.

Further, in the above step, the formation rate of the forming part 23 in the movement direction of the base 13 is 2-200 cm/h. Of course, during the practical operation, the formation rate of the forming part 23 may be flexibly adjusted according to the operating condition and the processing specification of the products. In principle, any formation rate of the forming part 23 is possible as long as the actual operation requirement of the three-dimensional printing method can be met.

In conclusion, the three-dimensional printing device provided in the present invention comprises: a chassis, a light source and a controller, wherein a liquid storage tank is arranged in the middle of the chassis, an anti-sticking element is arranged on the inner wall of the liquid storage tank, and the liquid storage tank is used for holding polymerizable liquid; and further comprises: a base which is adapted to the liquid storage tank in a para-position way, wherein the base is connected with a driving device, and the light source is matched with the bottom of the base. During the operation of the three-dimensional printing device, by using the anti-sticking element as a covering part for the liquid storage tank, the forming part formed by curing the polymerizable liquid can lose contact with the anti-sticking element quickly and efficiently, so as to carry out further formation and processing operations. In this way, the whole three-dimensional printing process is more rapid and efficient. Meanwhile, the damage to the structure of the product or component caused by excessive adhesion during the separation of the formed product from the device component is effectively avoided, and therefore the processing effect of the product and the stable operation of the device component are ensured.

In addition, the three-dimensional printing method using the above three-dimensional printing device as provided in the present invention, can make the three-dimensional printing process easier and more efficient and avoid the damage to both the device and the product.

The three-dimensional printing device and the three-dimensional printing method using the three-dimensional printing device as provided in the present invention have been described above in detail. The principle and implementations of the present invention have been explained by specific embodiments. The description of the above embodiments is merely provided for helping the understanding of the method of the present invention and its main ideas. It should be noted that various improvements and modifications may be made to the present invention by a person of ordinary skill in the art without departing from the principle of the present invention, and those improvements and modifications shall fall into the protection scope of the claims of the present invention.

What is claimed is:

1. A 3D printer comprising:
   a liquid storage tank configured to hold a polymerization liquid;
   an anti-sticking element arranged on a bottom of the liquid storage tank and in contact with the polymerization liquid, the anti-sticking element being a polymer thin film used as a covering part for the liquid storage tank, wherein
   a three-dimensional part is formed by polymerization of the polymerization liquid in a vicinity of the bottom of the liquid storage tank,
   the three-dimensional part directly contacts with the anti-sticking element,
   the anti-sticking element prevents the three-dimensional part from sticking to the bottom of the liquid storage tank,
   an outer surface of the anti-sticking element includes a plurality of microscopic three-dimensional modules, which are in contact with the polymerization liquid,
   a width of at least one of the plurality of microscopic three-dimensional modules is in a range from 0.01 μm to 10 μm,
   a ratio of a length of at least one of the plurality of microscopic three-dimensional modules to a width of the at least one of the plurality of microscopic three-dimensional modules is approximately 1/1 to 1000/1,
   a ratio of a length of at least one of the plurality of microscopic three-dimensional modules to a distance between the at least one of the plurality of microscopic three-dimensional modules and a neighboring microscopic three-dimensional module is approximately 1/1 to 1000/1,
   the plurality of microscopic three-dimensional modules reduce an effective contact area between the three-dimensional part and the anti-sticking element, and
   a light source configured to irradiate the polymerization liquid in the vicinity of the bottom of the liquid storage tank to form the three-dimensional part.

2. The 3D printer of claim 1, wherein an adhesion force between the three-dimensional part and the anti-sticking element is at least 50% less than the adhesion force between the three-dimensional part and a base, the three-dimensional part formed between the anti-sticking element and the base, and wherein the three-dimensional part is separated from the anti-sticking element through movement of the base.

3. The 3D printer of claim 1, wherein at least one of the plurality of microscopic three-dimensional modules comprises a protrusion structure that reduces an area of the at least one of the plurality of microscopic three-dimensional modules that is in contact with the polymerization liquid.

4. The 3D printer of claim 1, wherein a shape of at least one of the plurality of microscopic three-dimensional modules is selected from a group consisting of a cylinder, a cone, a tower, a boss, and a hole.

5. The 3D printer of claim 1, wherein the anti-sticking element comprises a fluorine-containing polymer thin film.

6. The 3D printer of claim 1, wherein the light sources is selected from a group consisting of a full spectrum halogen lamp, an ultraviolet light-emitting diode, and a laser diode.

7. The 3D printer of claim 1, wherein the anti-sticking element is located between the light source and a base, the 3D printer further comprising a driving device configured to move the base in a direction away from the light source to separate the three-dimensional part from the anti-sticking element.

8. The 3D printer of claim 1, wherein the anti-sticking element is integrally formed with the liquid storage tank.

* * * * *